Patented Oct. 18, 1932

1,883,150

UNITED STATES PATENT OFFICE

ROBERT M. WASHBURN, OF EVANSTON, ILLINOIS, ASSIGNOR TO LIQUID DEHYDRATION CORPORATION, OF CHICAGO, ILLINOIS, A CORPORATION OF DELAWARE

POWDERED CITROUS FRUIT JUICES AND PROCESS OF MAKING THE SAME

No Drawing. Application filed June 10, 1929. Serial No. 369,927.

This invention relates to a powdered citrous fruit juice and to a process of dehydrating the juices of citrous fruit to obtain a dry product having a flavor and aroma closely resembling that of the natural juice and being relatively non-hygroscopic.

The reduction of citrous fruit juices from liquid to solid form has been the goal of a great many, but the difficulties encountered in the preparation of a satisfactory dried fruit juice product have never been entirely overcome. These difficulties arise from the fact that the natural flavor and aroma of citrous fruits are quickly dissipated in practically any method of dehydrating the fruit juices and further that the solids contained in the juice of citrous fruit, and more particularly oranges, consist largely of invert sugars which cause the dry product resulting from the dehydrating process to be extremely hygroscopic.

Practically the only known way of satisfactorily reducing the hygroscopicity of the dried juices of citrous fruit is to add a stabilizer of a colloidal nature. Certain stabilizers, such as pectin, gelatinized starch and vegetable gums have heretofore been proposed. Pectin has excellent qualities as a stabilizer but has other objectionable qualities, such as introducing a slimy or syrupy character to the reconstituted juice powder and being in the main too expensive. Boiled starch also constitutes a satisfactory stabilizer except that it introduces a slight starchy taste and being foreign to citrous fruit, must be considered as an adulterant. Agar-agar is another colloid that forms a satisfactory stabilizing agent except for the fact that unless very finely purified, it imparts to the reconstituted juice a peculiar odor and a slight darkening coloration and also has the property of congealing the reconstituted liquid into a jelly-like clot if too much agar-agar powder is used in reconstituting the beverage. Agar-agar, too, is radically foreign to fruit juices and therefore must also be considered as an adulterant.

It is therefore an important object of this invention to provide a stabilizer of suitable qualities and characteristics that may be used with the powdered juices of citrous fruit to reduce the hygroscopicity of such juices to a minimum without imparting thereto undesirable characteristics.

It is a further important object of this invention to provide a method of preparing the juices of citrous fruit in a dehydrated, powdered form without substantially destroying the natural flavors and aromas of the citrous juices.

It is a further important object of this invention to provide a dry, relatively non-hygroscopic product consisting of dehydrated juices of citrous fruit and a stabilizer derived from citrous fruits themselves, the product when reconstituted into liquid form serving as a pleasant substitute for the natural juices and being hardly distinguishable therefrom.

Other and further important objects of this invention will become apparent from the following description and appended claims.

The stabilizer which I prefer to use is prepared from the cooked and hydrated rinds of citrous fruit, preferably oranges. Such a stabilizer is most feasible and may be economically prepared from a product that would otherwise be largely wasted. In preparing a stabilizer from the hydrated rinds of oranges, only the clean rinds are used and these are first comminuted, suitably by putting the rinds through an ordinary meat grinder, and thus reducing them to small particles about the size of wheat grains. These particles are then placed in a suitable filter cloth and put into a pressure cooker to which water is added in sufficient quantity to cover the rinds. The entire mass is then cooked at a temperature of appoximately 250° F. for about twenty minutes. The cooking water is drained from the cooker and discarded. The pulp resulting from the cooking process is washed with twice its weight of water and the wash water discarded.

The cooking at a relatively high temperature effects the removal of the bitter tasting ingredients from the white portion of the rind, probably due to the removal of bitter oils. The cooking also effects the hydration of the cellulose fibers, softening the cell walls and tissue of the rind and swelling the comminuted particles or granules. While the rind is in this soft, expanded condition, it is milled through a suitable device, such as a stone mill, homogenizer, or other instrument which will grind it almost to a mustard fineness.

The high temperature cooking also appears to have a desirable effect upon the terpene content of the oils of the rind to prevent the development of any turpentine odor, such as is sometimes noticed in connection with orange and lemon oils.

Rinds cooked and ground in the above manner have very valuable qualities when added to dehydrated juices of citrous fruit and then reconstituted into a beverage. The hydrated rind pulp adds sufficient structure material to permit the use of only a very small amount of true colloid stabilization, which latter is furnished in sufficient quantity from the pectin released from the rind bathed in the above manner. On account of the removal of a part of the actual oil content of the rind, the degree of rind oil taste in the product is materially reduced, thereby permitting the use of a sufficient quantity of the pulped rind for stabilization purposes. In fact, this blend of pectin, fibrous material and oil in the cooked rind may be used in such large quantities as to render the finished powdered product nearly, if not quite, as rich in rind solids as in juice solids.

Upon reconstitution of the powder into a beverage, the rind, on account of its thorough hydration in the cooking process, readily goes into solution or at least into a fine dispersion of colloidal nature, whereas had the rinds been dried from their raw state, the fibrous matter of the rinds would have shrunk and become so hard as to make it practically impossible for the rind after drying to again take up water.

The pulpy material, consisting chiefly of tiny sacks of juice which accumulate on the strainer cloth during extraction, is not thrown away but is put through the mill, ground fine and added to the juice. In this way, there is practically no waste of juice. The seeds, of course, are not put through the mill.

The juice and the properly cooked and ground rinds are blended together in about equal proportions on a solid basis. The liquid mixture is dehydrated from a cold condition without the addition of any sugar and with little or no foreign stabilizer.

The dehydration of the liquid mixture is accomplished, preferably, in a dehydrating cell such as described in my U. S. Patent No. 1,844,707. The spray drying is effected at ordinary temperatures, averaging about 310° F. for the air as it enters the dehydration chamber, and about 210° F. as it leaves the chamber. The powder, however, does not reach such high temperatures due to the rapid evaporation of moisture from the sprayed liquid. The entire exposure period of the liquid product to the hot air is about fifteen seconds when the dehydration process is carried out in my apparatus. The powdered product is continuously and automatically removed from the drying chamber and stored in suitable metal receptacles.

Due to the fugitive nature of the natural aromas of the fruit juices, a considerable portion of the aroma of the orange juice is carried away with the heated air used in the drying process, with the result that the powdered product has rather a flat taste and lacks character. This loss of aroma is not peculiar to any one process of spray drying but is inherent in the product itself. However, since the use of my dehydrating process and apparatus permits the making of a larger size granule of finished powder, more of the elusive flavor giving esters will be retained in my product than where other dehydrating processes are employed.

The loss of flavoring esters may be compensated for, in large measure, in several ways. The addition of common salt to the orange juice mixture before dehydrating gives a beverage, on reconstitution of the dried product that appears stronger in flavor to the one drinking the beverage for the reason that salt increases the sensitiveness of one's tasting perception. The amount of salt added is preferably about one part of salt for each 150 parts of citrous solids in the dry product.

The orange oil not lost when the boiled water was poured off from the ground rind also increases the taste and aroma of the powder and assists in compensating for the loss of flavoring esters.

If additional aroma is desired, a measured amount of terpeneless orange oil, or lemon oil, as the case may be, may be added directly to the finished powder and this will bring about the result desired. The orange or lemon terpeneless oils are best introduced into the citrous powder by dissolving one cubic centimeter of terpeneless orange oil, or lemon oil, in ten cubic centimeters of ethyl alcohol and then adding this alcohol solution of a portion of the citrous base powder at the rate of one cubic centimeter to fifty grams of powder. The result of this mixture is that the powder forms a hard cake, which, however, is easily ground and thereafter remains in powdered form, the alcohol evaporating but the oil remaining in the powder. This flavored powder is then introduced into the base powder at the rate of one gram of flavored powder to one pound of base powder.

A commercial powder may be made by mixing dry one pound of the base powder with about two pounds of common sugar, adding the while one gram of flavored powder to each pound of commercially mixed powder.

Lemon juice powders are made in substantially the same manner as above described for orange juice powders, the proportion of ingredients varying, due to the high acidity in the lemon juice and general lack of flavor and aroma.

Grape fruit juice produces a very indifferent powder, if in pure form. It is a dirty gray color, with very little aroma, but it has a characteristic bitter grape fruit tang. A blend of grape fruit and orange, however, produces a very pleasing beverage, in which the fruit juices should be mixed at about 35% to 40% grape fruit juice to 60 to 65% of orange juice. This produces an orange colored product having the bitter tang of grape fruit and an acidity due to the grape fruit.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing a dried fruit juice powder, which comprises dehydrating a mixture of fruit juice and finely ground rinds of a citrous fruit from which objectionable oils have been extracted.

2. The process of preparing a dried fruit juice powder, which comprises spray drying a mixture of the juice of a citrous fruit and the finely ground, cooked rinds of a citrous fruit from which objectionable oils have been removed.

3. A dried powder of citrous fruit juice comprising a mixture of dehydrated fruit juice and of finely comminuted rinds of a citrous fruit free from objectionable oils.

4. A dried powder derived from a citrous fruit, which comprises a granular mixture of dehydrated citrous fruit juice, additional terpeneless oil of a citrous fruit and finely ground and hydrated rind pulp, free from objectionable oils.

In testimony whereof I have hereunto subscribed my name at Chicago, Cook County, Illinois.

ROBERT M. WASHBURN.